United States Patent
Bloy et al.

(10) Patent No.: US 11,983,787 B2
(45) Date of Patent: *May 14, 2024

(54) INTEGRATION OF WORKFLOW WITH DIGITAL ID

(71) Applicant: The Toronto-Dominion Bank, Toronto (CA)

(72) Inventors: Adrian Bloy, Ottawa (CA); Danielle Marie Mullenax, Gatineau (CA); Kevin Yuen, Toronto (CA); Daniel Lam Tin Cheung, Richmond Hill (CA); Asgar Maleki, Toronto (CA)

(73) Assignee: Toronto Dominion Bank

( * ) Notice: Subject to any disclaimer, the term of this patent is extended or adjusted under 35 U.S.C. 154(b) by 0 days.

This patent is subject to a terminal disclaimer.

(21) Appl. No.: 18/334,726

(22) Filed: Jun. 14, 2023

(65) Prior Publication Data
US 2023/0325957 A1    Oct. 12, 2023

Related U.S. Application Data

(63) Continuation of application No. 17/457,585, filed on Dec. 3, 2021, now Pat. No. 11,704,761, which is a
(Continued)

(51) Int. Cl.
*G06Q 40/00*    (2023.01)
*G06Q 40/03*    (2023.01)
(Continued)

(52) U.S. Cl.
CPC ........... *G06Q 50/265* (2013.01); *G06Q 40/03* (2023.01); *H04L 63/0884* (2013.01); *H04L 9/3236* (2013.01); *H04L 9/50* (2022.05)

(58) Field of Classification Search
CPC .... G06Q 40/00; G06Q 50/265; G06Q 40/025; H04L 9/3236; H04L 63/0884; H04L 2209/38
See application file for complete search history.

(56) References Cited

U.S. PATENT DOCUMENTS 5,699,527 A    12/1997    Davidson
6,088,686 A    7/2000    Walker et al.
(Continued)

FOREIGN PATENT DOCUMENTS

WO    WO 2005010731    2/2005
WO    WO 2012083113    6/2012
(Continued)

OTHER PUBLICATIONS

Interoperability of e-government information systems: Issues of identification and data sharing B Otjacques, P Hitzelberger, F Feltz—Journal of management . . . , 2007—Taylor & Francis (Year: 2007).*

(Continued)

*Primary Examiner* — Lalita M Hamilton
(74) *Attorney, Agent, or Firm* — Fish & Richardson P.C.

(57) ABSTRACT

The present disclosure involves systems, software, and computer implemented methods for performing identity validation using a digital ID shared and trusted among a coalition of institutions. One example method includes receiving, via a communications module and from a first consortium member system, a set of input credentials from a first consortium member system associated with an operation, where the set of input credentials is associated with a user. A digital ID is identified corresponding to the set of input credentials and the first user, wherein each digital ID uniquely identifies a particular user and corresponds to at least one user account associated with other consortium member systems in a trusted consortium network. Using the other user accounts, additional user account information associated with the user is obtained and used in a verification operation.

20 Claims, 3 Drawing Sheets

Related U.S. Application Data continuation of application No. 16/416,698, filed on May 20, 2019, now Pat. No. 11,227,354.

(51) Int. Cl.
  *G06Q 50/26* (2012.01)
  *H04L 9/40* (2022.01)
  *H04L 9/00* (2022.01)
  *H04L 9/32* (2006.01)

(56) References Cited

U.S. PATENT DOCUMENTS

| | | |
|---|---|---|
| 6,185,543 B1 | 2/2001 | Galperin et al. |
| 6,366,892 B1 | 4/2002 | Altman et al. |
| 7,249,097 B2 | 7/2007 | Hutchison et al. |
| 7,620,597 B2 | 11/2009 | Eze |
| 7,680,728 B2 | 3/2010 | Lazerson |
| 7,801,807 B2 | 9/2010 | DeFrancesco et al. |
| 7,818,399 B1 | 10/2010 | Ross, Jr. et al. |
| 7,953,861 B2 | 5/2011 | Yardley et al. |
| 8,352,370 B1 | 1/2013 | White et al. |
| 9,082,119 B2 | 7/2015 | Ortiz et al. |
| 9,558,492 B2 | 1/2017 | Carrott |
| 9,697,517 B1 | 7/2017 | Chambers et al. |
| 9,779,405 B1 | 10/2017 | Krausz et al. |
| 10,235,668 B1 | 3/2019 | Ellis et al. |
| 10,417,706 B1 | 9/2019 | Simon |
| 10,740,737 B2 | 8/2020 | Pareek |
| 10,853,791 B1 | 12/2020 | Ellis et al. |
| 11,062,302 B1 | 7/2021 | Ho et al. |
| 11,227,354 B2 | 1/2022 | Bloy et al. |
| 11,367,059 B2 | 6/2022 | Bloy et al. |
| 11,514,424 B2 | 11/2022 | Bloy et al. |
| 11,636,453 B2 | 4/2023 | Bloy |
| 11,688,003 B2 | 6/2023 | Bloy et al. |
| 11,694,179 B2 | 7/2023 | Bloy et al. |
| 11,704,761 B2 | 7/2023 | Bloy et al. |
| 2002/0166066 A1 | 11/2002 | Haji et al. |
| 2003/0101116 A1 | 5/2003 | Rosko et al. |
| 2003/0191714 A1 | 10/2003 | Norris |
| 2004/0030645 A1 | 2/2004 | Monaghan |
| 2004/0060005 A1 | 3/2004 | Vasey |
| 2005/0077349 A1 | 4/2005 | Bonalle et al. |
| 2005/0102284 A1 | 5/2005 | Srinivasan et al. |
| 2005/0108129 A1 | 5/2005 | Seibert et al. |
| 2005/0165684 A1 | 7/2005 | Jensen et al. |
| 2006/0165060 A1 | 7/2006 | Dua |
| 2007/0050289 A1 | 3/2007 | Zeller et al. |
| 2007/0233902 A1 | 10/2007 | Trefler et al. |
| 2008/0058014 A1 | 3/2008 | Khan et al. |
| 2008/0126244 A1 | 5/2008 | Loving et al. |
| 2008/0243593 A1 | 10/2008 | Ko et al. |
| 2009/0171839 A1 | 7/2009 | Rosano et al. |
| 2009/0240947 A1 | 9/2009 | Goyal et al. |
| 2009/0254440 A1 | 10/2009 | Pharris |
| 2009/0313536 A1 | 12/2009 | Karidi et al. |
| 2010/0138344 A1 | 6/2010 | Wong et al. |
| 2011/0087595 A1 | 4/2011 | Sabella |
| 2012/0023011 A1 | 1/2012 | Hurwitz et al. |
| 2012/0215605 A1 | 8/2012 | Gardner et al. |
| 2012/0215609 A1 | 8/2012 | Yoo et al. |
| 2012/0290486 A1 | 11/2012 | Dobrowolski et al. |
| 2012/0296824 A1 | 11/2012 | Rosano |
| 2013/0054454 A1 | 2/2013 | Purves et al. |
| 2013/0124349 A1 | 5/2013 | Khan et al. |
| 2013/0159154 A1 | 6/2013 | Purves et al. |
| 2013/0185192 A1 | 7/2013 | McGuire |
| 2013/0238500 A1 | 9/2013 | Moore |
| 2013/0346320 A1 | 12/2013 | Jin et al. |
| 2014/0058834 A1 | 2/2014 | Liberty et al. |
| 2014/0070001 A1 | 3/2014 | Sanchez et al. |
| 2014/0108263 A1 | 4/2014 | Ortiz et al. |
| 2014/0279552 A1 | 9/2014 | Ortiz et al. |
| 2015/0032627 A1 | 1/2015 | Dill et al. |
| 2016/0034891 A1 | 2/2016 | Carpenter et al. |
| 2016/0048822 A1 | 2/2016 | Forrest |
| 2016/0071094 A1 | 3/2016 | Krishnaiah et al. |
| 2016/0117670 A1 | 4/2016 | Davis |
| 2016/0173473 A1 | 6/2016 | Naccache |
| 2016/0217464 A1 | 7/2016 | Jajara et al. |
| 2016/0232600 A1 | 8/2016 | Purves |
| 2016/0269898 A1 | 9/2016 | Kueh |
| 2016/0335688 A1 | 11/2016 | Wang et al. |
| 2016/0350849 A1 | 12/2016 | Lynch |
| 2016/0358250 A1 | 12/2016 | Dogin et al. |
| 2016/0364795 A1 | 12/2016 | Bhaget et al. |
| 2016/0379192 A1 | 12/2016 | Purves et al. |
| 2017/0017957 A1 | 1/2017 | Radu |
| 2017/0017958 A1 | 1/2017 | Scott et al. |
| 2017/0061532 A1 | 3/2017 | Koltnow et al. |
| 2017/0109736 A1 | 4/2017 | Heiman et al. |
| 2017/0109745 A1 | 4/2017 | Al-Bedaiwi et al. |
| 2017/0161735 A1 | 6/2017 | Ortiz et al. |
| 2017/0228704 A1 | 8/2017 | Zhou et al. |
| 2017/0270603 A1 | 9/2017 | Berta et al. |
| 2017/0278089 A1 | 9/2017 | Kothari et al. |
| 2017/0286768 A1 | 10/2017 | Livesay et al. |
| 2017/0337626 A1 | 11/2017 | Bryant et al. |
| 2017/0357957 A1 | 12/2017 | Mehta et al. |
| 2018/0018660 A1 | 1/2018 | Gomes et al. |
| 2018/0020348 A1 | 1/2018 | Peterson et al. |
| 2018/0075527 A1 | 3/2018 | Nagla et al. |
| 2018/0082284 A1 | 3/2018 | Gomes et al. |
| 2018/0082303 A1 | 3/2018 | Chan-bauza et al. |
| 2018/0137508 A1 | 5/2018 | Shah et al. |
| 2018/0174138 A1 | 6/2018 | Subbarayan et al. |
| 2018/0183737 A1 | 6/2018 | Subbarayan et al. |
| 2018/0189756 A1 | 7/2018 | Purves et al. |
| 2018/0276656 A1 | 9/2018 | Goyal et al. |
| 2018/0330459 A1 | 11/2018 | Elder et al. |
| 2019/0087809 A1 | 3/2019 | Bloy et al. |
| 2019/0087894 A1 | 3/2019 | Bloy et al. |
| 2019/0197231 A1 | 6/2019 | Meier |
| 2019/0230080 A1 | 7/2019 | Boothby |
| 2019/0251542 A1 | 8/2019 | Sjoberg et al. |
| 2019/0273607 A1 | 9/2019 | Van Der Velden et al. |
| 2019/0310837 A1 | 10/2019 | Zmijewski et al. |
| 2020/0007336 A1 | 1/2020 | Wengel |
| 2020/0118205 A1 | 4/2020 | Bloy et al. |
| 2020/0265435 A1 | 8/2020 | Bankston et al. |
| 2020/0302081 A1 | 9/2020 | Faitelson et al. |
| 2020/0327529 A1 | 10/2020 | Mukherjee et al. |
| 2020/0372600 A1 | 11/2020 | Bloy et al. |
| 2021/0133704 A1 | 5/2021 | Bloy et al. |
| 2021/0279795 A1 | 9/2021 | Bloy et al. |
| 2022/0092715 A1 | 3/2022 | Bloy et al. |
| 2022/0164779 A1 | 5/2022 | Bloy et al. |
| 2022/0318782 A1 | 10/2022 | Bloy et al. |
| 2023/0334459 A1 | 10/2023 | Bloy et al. |
| 2023/0351499 A1 | 11/2023 | Bloy et al. |

FOREIGN PATENT DOCUMENTS

| | | | |
|---|---|---|---|
| WO | WO 2013083939 | 6/2013 | |
| WO | WO 2016161272 | 10/2016 | |
| WO | WO-2016161272 A1 * | 10/2016 | ............ H04L 63/08 |

OTHER PUBLICATIONS

Afteracademy.com [online], "What is a TCP 3-Way Handshake Process?" Feb. 2020, [retrieved on Jun. 29, 2021], retrieved from: URL <https://afteracademy.com/blog/what-is-a-tcp-3-way-handshake-process>, 9 pages.

Chan et al., "Designing a Credit Approval System Using Web Services, BPEL, and AJAX." 2009 IEEE International Conference on e-Business Engineering. IEEE, Oct. 2009, 8 pages.

Envestnet [online], "Yodlee Risk Insight for Pre-Qualification" Mar. 19, 2019, retrieved from URL <https://resources.yodlee.com/risk-insights/envestnet-yodlee-risk-insight-for-pre-qualification>, 2 pages.

Mnuchin, et al., "A Financial System That Creates Economic Opportunities Nonbank Financials, Fintech, and Innovation" Date of Publication: Jul. 18, 2018. retrieved from URL <https://home.

(56) References Cited

OTHER PUBLICATIONS treasury.gov/sites/default/files/2018-08/A-Financial-System-that-Creates-Economic-Opportunities---Nonbank-Financials-Fintech-and-Innovation_0.pdf>, 222 pages.

Otjacques et al., "Interoperability of e-government information systems: Issues of identification and data sharing." Journal of management information systems 23.4, May 2007, 24 pages.

Sirbu et al., "Credits and debits on the Internet." IEEE spectrum 34.2, Feb. 1997, 7 pages.

Techopeida.com [online], "Three-Way Handshake" Nov. 2020, [retrieved on Jun. 29, 2021], retrieved from: URL <https://www.techopedia.com/definition/10339/three-way-handshake>, 5 pages.

Urrico "Emphasizing Account Opening, Cybersecurity & Consumer Experience" Date of Publication: Jul. 31, 2018; retrieved from URL <https://www.cutimes.com/2018/07/31/emphasizing-account-opening-cybersecurity-consumer/?slreturn=20180929060828>, 2 pages.

Office Action in Canada Appln. No. 3,017,913, mailed on Oct. 3, 2023, 15 pages.

Office Action in Canada Appln. No. 3,060,819, mailed on Oct. 5, 2023, 5 pages.

Song et al., "Database Design for Real-World E-Commerce Systems" IEEE Data Eng. Bull. 23.1, Mar. 2000, 6 pages.

Office Action in Canada Appln. No. 3,043,841, mailed on Dec. 14, 2023, 4 pages.

\* cited by examiner

INTEGRATION OF WORKFLOW WITH DIGITAL ID

CROSS-REFERENCE TO RELATED PATENT APPLICATIONS

This application is a continuation of U.S. patent application Ser. No. 17/457,585, filed Dec. 3, 2021, which is a continuation of and claims the benefit of priority to U.S. patent application Ser. No. 16/416,698, filed May 20, 2019, the contents of which are incorporated by reference herein.

TECHNICAL FIELD

The present disclosure relates to computer-implemented methods, software, and systems for performing identity validation using a digital identification (ID) shared and trusted in among a coalition of institutions, allowing user account information to be accessed across a plurality of entities and applications in a secure and immediate interaction.

BACKGROUND

There are numerous scenarios in which verification of identity may be required. For example, certain organizations may need to verify identity in order to, for example, satisfy regulations such as know your customer (KYC) and anti-money laundering (AML) regulations. Typically, such organizations rely on conventional methods to identify customers. For example, they may review physical identity documents, such as a passport, driver's license, or another government-issued identity document. Such traditional techniques can be insecure since physical identity documents can be falsified, altered or tampered with. Even legitimate physical identity documents can be lost or stolen, raising the risk of fraud.

Furthermore, verifying identity using physical identity documents typically requires a customer to be physically present at the location of the verifier. Such verification techniques do not allow for remote verification of identity.

Current lending and credit approval processes require detailed information about customers before approval can be granted, whether done using physical identity documents or by using digital inputs. Further, multiple levels of checks and approvals are needed before a credit decision can be made.

SUMMARY

The present disclosure involves systems, software, and computer-implemented methods for providing credit application and provisioning operations associated with a financial institution within ongoing online interactions with one or more merchants transactions. A first example system includes a communications module, at least one memory storing instructions and a repository storing a plurality of digital identifiers (IDs), and at least one hardware processor interoperably coupled with the at least one memory and the communications module, wherein the instructions instruct the at least one hardware processor to perform operations. Each digital ID can uniquely identify a particular user, wherein each digital ID corresponds to a plurality of user accounts for the particular user, each of the plurality of user accounts associated with a particular consortium member system. The different consortium member systems are associated with a trusted consortium network used to verify identities of particular users of each consortium member system. The operations performed by the at least one hardware processor can include receiving a set of input credentials associated with a request for an operation performed in association with the first consortium member system via the communications module and from a first consortium member system. The set of input credentials are associated with a first user. A particular digital ID corresponding to the set of input credentials and the first user is identified. At least one user account corresponding to the particular digital ID is determined, where each of the at least one determined user accounts is associated with a particular other consortium member system, and where each of the other consortium member systems are different than the first consortium member system. A set of information associated with the first user is obtained from at least one of the at least one determined user accounts corresponding to the particular digital ID, and a response is generated based on the obtained set of information. The generated response is then transmitted via the communications module to the first consortium member.

Implementations can optionally include one or more of the following features.

In some instances, the operation performed in association with the first consortium member comprises an identity verification operation, wherein the request is transmitted by the first consortium member system in response to a failure by the first consortium member system to complete identity verification for the first user.

In some instances, the set of input credentials and the request are received via a consortium application programming interface (API) embedded within an online application managed by the first consortium member system.

In some instances, obtaining the set of information associated with the first user from at least one of the at least one determined user accounts corresponding to the particular digital ID comprises generating an authorization token in response to identifying the particular digital ID corresponding to the set of input credentials and the first user, where the authorization token allows access to data related to the at least one determined user accounts corresponding to the particular digital ID at the other consortium member systems. A request for data associated with the determined user account of the particular other consortium member system is transmitted to at least a subset of the other consortium member systems via the communications module. In response to the requests for data, responsive sets of data associated with the determined user accounts are then received from the particular other consortium member systems.

In some instances, the operation performed in association with the first consortium member comprises an identity verification operation, where the request is transmitted by the first consortium member system prior to an attempted identity verification for the first user, and where the information included in the generated response is used by the first consortium member to perform the identity verification.

In some instances, a first one of the at least one determined user accounts corresponding to the particular digital ID is associated with a first consortium member associated with a financial institution, and a second one of the at least one determined user accounts corresponding to the particular digital ID is associated with a second consortium member associated with a non-financial institution.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
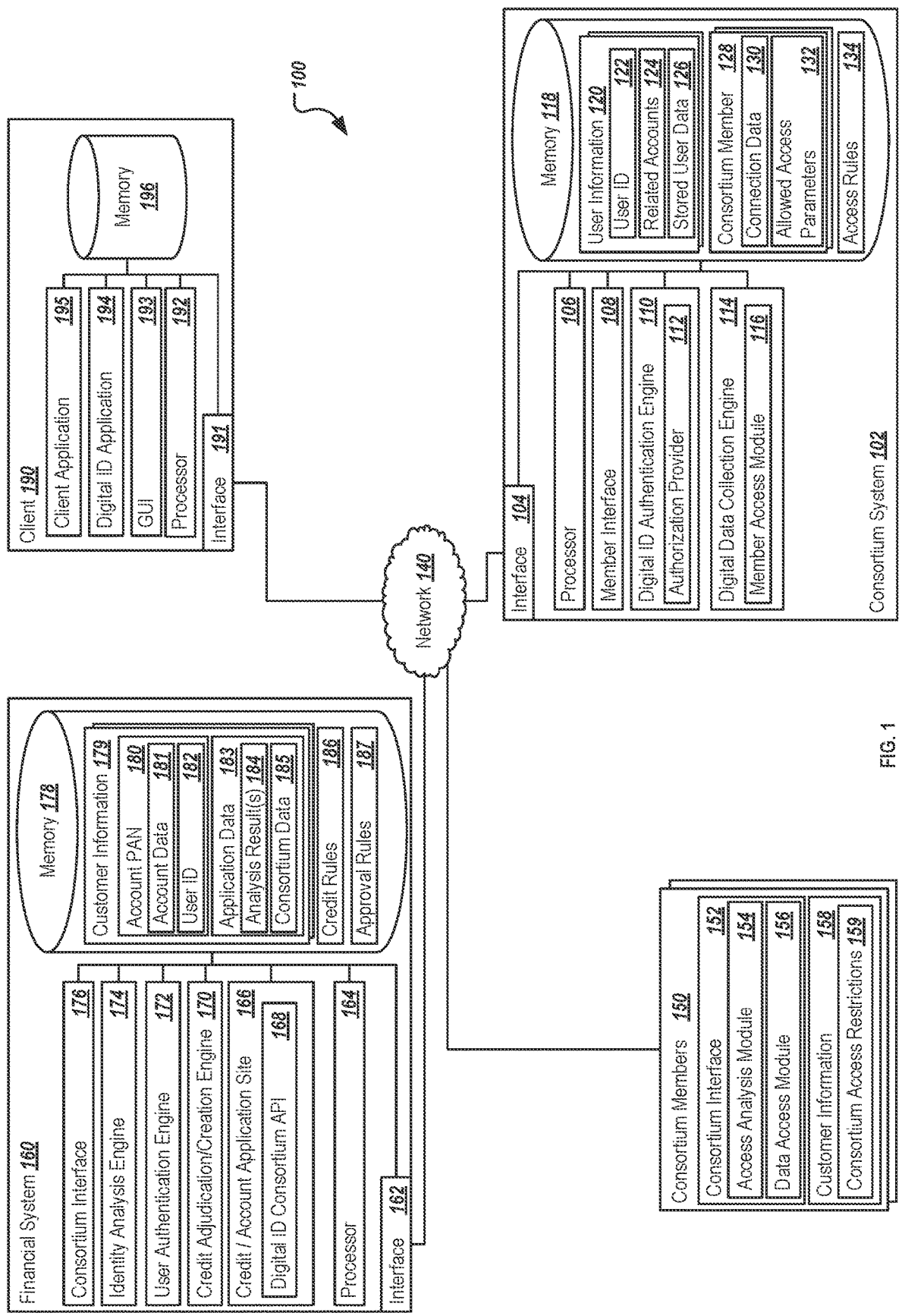
FIG. 1 is a block diagram illustrating an example system for providing credit application and provisioning operations associated with a financial institution within ongoing online interactions with one or more merchants transactions in a first implementation.

The present disclosure describes various tools and techniques associated with performing identity validation using a digital identification (ID) shared and trusted in among a coalition of institutions, allowing user account information to be accessed across a plurality of entities and applications in a secure and immediate interaction. The coalition of institutions may be a plurality of financial institutions, including but not limited to banks, credit bureaus, and other lending institutions. Further, information for the coalition of institutions may be acquired from a plurality of sources, including private and proprietary information and/or sources, as well as public or government databases and/or sources. The system provides a trusted agreement between the parties to allow for secure validation using a digital identity network of trusted information about particular users and/or customers to provide for securely shared information about customers using a common or shared digital ID.

Current lending and credit approval processes generally require detailed information about a customer before approval. Specifically, several approvals may need to be made when attempting to approve a credit decision for a customer.
  1. Anti-Money Laundering (AML) Analysis: Is the applicant high risk for financial crimes (e.g., money laundering or terrorist funding)?
  2. Know Your Customer Analysis (KYCA)/Identity Analysis: Is this person who they say they are?
  3. Fraudulent Application Analysis: Is the person applying who they say they are?
  4. Creditworthiness Analysis: Is this person able to pay back the credit if authorized?

Each of the decisions may be separately determined, and all must be satisfied in order to approve the credit request. In some instances, the fraud and creditworthiness analyses may be relatively easy to pass based on available rule sets and known evaluation techniques. However, the KYCA/Identity analyses and the fraudulent application analysis requires a strict determination of the person applying for credit, which is often difficult to accomplish based on information available. In those cases, additional checks and considerations may be performed that adds delays to the process of validation. In some instances, particularly with partially or fully digital companies providing services over a large area with no physical locations available at all or nearby to customers, a traditional in-person meeting and provision of additional legal or other identifying or verification documentation is not available.

The present solution described herein allows identity validation to be performed using a digital ID shared and trusted in among a plurality, or coalition, of financial institutions. The system can include a trusted agreement and validation technique among financial institutions using, for example, a blockchain process to securely send customer information back and forth between institutions for securely validating the identity of particular customers. While the illustrated examples are described as financial institutions, any suitable institutions may be included within the coalition of the present solutions where such institutions and their data management and identity analysis procedures meet both technical and regulatory requirements such that information from those other sources can participate in the use of and validate digital IDs such that they can provide at least a portion of the information required for KYC and identity analysis operations. Example digital IDs have been described, in part, in U.S. patent application Ser. No. 15/995,770, entitled "Digital Identity Network Interface System", which is incorporated by reference herein, and which may be used as part of the present solution, although alternative and additional options can be used. Generally, the digital ID used represents a digital identity among the financial institutions and other trusted identity providers (e.g., Verified.Me Network) that represents a trusted identifier of a user. For example, if a user is opening an account with TD Bank, and that same user already has an account with another financial provider (e.g., Bank of America or "BOA"), then the BOA account can be used to perform identity confirmation for both ADL and KYC regulations for purposes of opening the account with TD Bank. In some instances, the financial institution alone may be used to perform both ADL and KYC regulations. In other instances, at least one non-financial institution in combination with a financial institution, or two or more different financial institutions, may be used to obtain additional ADL and KYC information related to a particular customer/applicant for the described authentication processes. By using the trusted consortium to identify the customer/applicant in a trusted manner, the digital ID can be used for purposes of identity confirmation and analysis for consortium members who have not previously done business or interacted with that customer/applicant.

As noted, in some instances, a blockchain-based solution may be used, where digital IDs may be represented in a blockchain network including a plurality of nodes. The blockchain network is a decentralized peer-to-peer network in which nodes may maintain respective copies of an append-only ledger. The blockchain network may be a permissioned blockchain network in which only authorized nodes are permitted to add blocks to the blockchain. For example, only verified nodes may be granted permission to write to the blockchain. The verified nodes may be trusted nodes such as nodes associated with government organizations or other trusted entities such as banks and other entities included in and trusted by the coalition. By way of example, the verified nodes may be associated with a driver's license bureau, a credit bureau, a government identity issuing office such as a passport office or birth registry office, or an office of another type. Given ones of these nodes may maintain identity records of various types. For example, a node associated with a passport office may maintain digital passport records, a node associated with a driver's license bureau may maintain digital licensing records, a node associated with a credit bureau may maintain digital credit records, and a node associated with a bank may maintain digital banking records. Various verified nodes may maintain contact information records which may, for example, specify an email address, postal address, telephone number, or other type of contact information.

Accordingly, at least some verified nodes may write to the blockchain. At least some of the blocks written to the blockchain may be related to digital identity data. The digital identity network may store digital identity data associated with a plurality of users. In at least some embodiments, digital identity data representing personal information may not be included in the blockchain. Instead, the blocks may store a private secret that is related to such digital identity data. The private secret may act as proof to the existence of the digital identity data and may be used to verify the authenticity of the data. For example, in at least some embodiments, the private secret may be a hash of the digital identity data such that, when the digital identity data is provided to another system (i.e., a system apart from the verified node maintaining the digital identity data), it may be verified from the hash stored in a block on the blockchain.

The blockchain network may, for example, be implemented using Hyperledger Fabric, for example. It will, however, be appreciated that the blockchain network may take other forms.

In general, the tools and techniques herein provide advantages over current solutions. First, users with no prior interactions with the particular institution can avoid delays in the particular institution by confirming the user's identity through the consortium solution. By allowing the user to authenticate themselves via their digital ID to the consortium in association with an application or interaction initiated with a first entity, the first entity can leverage that authentication to become an authorized accessor of information stored at the consortium or made available by one or more of the consortium members. The information obtained by the first entity can then be used in their application or interaction decisions without requiring additional information from the user while being able to trust the information available from the other entities or consortium. In doing so, delays in validation of identity are removed, and immediate credit acceptance and/or approval may be available when the other analyses are successfully passed.

Turning to the illustrated example implementation, FIG. 1 is a block diagram illustrating an example system 100 for performing identity validation using a digital identification (ID) shared and trusted in among a coalition of institutions. Specifically, the illustrated implementation is directed to a solution where a plurality of entities, or coalition members 150, agree to enter a coalition that allows the secure sharing of information about each entity's users or customers to other members of the coalition, allowing for entities who are interacting with a user for a first time or require additional information or identity verification the ability access existing user information stored or managed by or obtained from one or more other trusted entities in the coalition. For example, when a user enters a new relationship with a financial entity (e.g., an online bank), or requests additional services requiring further analysis or verification (e.g., a loan or credit application), the user may normally need to provide information to prove their identity and pass one or more fraud-based analyses, which may include a time-consuming set of steps and information provision. By using the current solution, at least some of those time-consuming operations can be replaced through allowing the user to authenticate themselves to a centralized or cloud-based coalition system via the entity (e.g., through a web application or online portal), such that the user and the coalition system can then provide authentication to the entity to access and obtain relevant user information from the one or more coalition members as needed for the current process or operation. In some instances, application programming interfaces (APIs) and other tools may be used in connection with real-time credit or account applications, allowing information to be provided by the user for authentication to the coalition system to greatly speed up credit and/or application analyses without the need for additional information and documentation to be obtained from the user. In some instances, the solution may be used to fill one or more fields in an application for new users, while in others, particular information may be obtained and verified during the process without presentation to the user or a corresponding graphical presentation.

In general, the system 100 allows the illustrated components to share and communicate information across devices and systems (e.g., financial system 160, other consortium members 150, the consortium system 102, and one or more clients 190, among others, via network 140). As described herein, one or more of the financial system 160, some or all of the consortium members 150, and/or the consortium system 102 may be cloud-based components or systems (e.g., partially or fully), while in other instances, non-cloud-based systems may be used. In some instances, non-cloud-based systems, such as on-premise systems, client-server applications, and applications running on one or more client devices, as well as combinations thereof, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, financial system 160, other consortium members 150, the consortium system 102, and clients 190 may each be any computer or processing devices such as, for example, a blade server, general-purpose personal computer (PC), Mac®, workstation, UNIX-based workstation, or any other suitable device. Moreover, although FIG. 1 illustrates a single financial system 160 and a single consortium system 102, either or both of the systems can be implemented using a single system or more than those illustrated, as well as computers other than servers, including a server pool. The same may apply for the other components illustrated and described herein. In other words, the present disclosure contemplates computers other than general-purpose computers, as well as computers without conventional operating systems. Similarly, the client 190 may be any system that can request data and/or interact with the financial systems 160 and others. The client 190, also referred to as client device 190, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™ Android™, Windows Phone OS, or iOS™, among others. The client 190 may include one or more merchant- or financial institution-specific applications executing on the client 190, or the client 190 may include one or more Web browsers or web applications that can interact with particular applications executing remotely from the client 190, such as the credit or account application site 166 or digital ID application 194, among others.

The consortium system 102 may be a site, system, or service that provides support and technical connections between the different consortium members 150, including financial system 160, such that those members 150, 160 can obtain additional information about users and customers based on a digital ID associated with the users. The consortium system 102 can provide a combined agreement between entities and institutions to provide identity verification across system boundaries in response to authenticating information received from the corresponding user. To do so, requests may be received at the consortium system 102 from operations or interactions associated with a particular consortium member 150, here, financial system 160. It should be noted that the consortium members 150 do not need to be financial-related companies or entities in all implementations. Consortium members 150 may include public or private databases and other information sources from which user or customer information is available and has been agreed to be shared. In some instances, the consortium system 102 may store customer or user information locally in memory 118, while in other instances, the consortium system 102 may perform the operations of validating a particular digital ID associated with a user in response to a request from a particular consortium member 150, and, in response to proper validation, can access one or more other consortium member 150 systems via a member interface 108 to access and obtain any user-related information that is relevant to a current transaction and that is not available at or to the particular consortium member 150.

As illustrated, the consortium system 102 includes or is associated with interface 104, processor(s) 106, a member interface 108, a digital ID authentication engine 110, a digital data collection engine 114, and memory 118. While illustrated as provided by or included in the consortium system 102, parts of the illustrated contents may be separate or remote from the consortium system 102, or the consortium system 102 may be distributed.

The interface 104 of the consortium system 102 is used by the consortium system 102 for communicating with other systems in a distributed environment—including within the environment 100—connected to the network 140, e.g., financial system 160, other consortium members 150, and client(s) 190, as well as with other systems communicably coupled to the illustrated consortium system 102 and/or network 140. Generally, the interface 104 comprises logic encoded in software and/or hardware in a suitable combination and operable to communicate with the network 140 and other components. More specifically, the interface 104 may comprise software supporting one or more communication protocols associated with communications such that the network 140 and/or interface's hardware is operable to communicate physical signals within and outside of the illustrated environment 100. Still further, the interface 104 may allow the consortium system 102 to communicate with the client 190, the financial system 160, and/or other portions illustrated within the consortium system 102 to perform the operations described herein.

Network 140 facilitates wireless or wireline communications between the components of the environment 100 (e.g., between the consortium system 102, the financial system 160, the consortium members 150, and client(s) 190, etc.), as well as with any other local or remote computers, such as additional mobile devices, clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components (e.g., the consortium system 102, the financial system 160, etc.) may be included within or deployed to network 140 or a portion thereof as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11a/b/g/n/ac, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

The consortium system 102, as illustrated, includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the consortium system 102. Specifically, the processor 106 executes the algorithms and operations described in the illustrated figures, as well as the various software modules and functionality, including the functionality for sending communications to and receiving transmissions from the financial system 160, other consortium members 150, and clients 190, as well as to other devices and systems. Each processor 106 may have a single or multiple core, with each core available to host and execute an individual processing thread. Further, the number of, types of, and particular processors 106 used to execute the operations described herein may be dynamically determined based on a number of requests, interactions, and operations associated with the consortium system 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The consortium system 102, as noted, can include, among other components, one or more applications, entities, programs, agents, or other software or similar components capable of performing the operations described herein. As illustrated, the consortium system 102 includes a member interface 108 that can be used to allow consortium members 150 to communicate with the consortium system 102. The member interface 108 may be associated with or accessed through any suitable communication or call, including those from one or more APIs. An example API includes the digital ID consortium API 168 embedded in or associated with a credit or account application site 166 provided by or associated with the financial system 160, which is one of a plurality of consortium members 150. Other methods of communication and interactions may be used in other instances or implementations, and an API-based communication is not required.

The credit or account application site 166 may be any website, application, program, other component, or combination thereof that is associated with a financial institution and is used to provide operations for performing identity verification. In some instances, such as those described herein, the credit or account application site 166 can be used when users or customers are attempting to apply for loans or other types of credit, including credit cards. In other instances, information about a particular user or customer may be needed for other purposes, such as insurance, health care, employment, or other reasons. In those instances, the credit or account application site 166 may be for other indirectly financial or non-financial purposes, but may still require identity verification processes and operations unavailable in current solutions. The credit or account application site 166 may be a web-based application or website, and can be accessed by a digital ID application 194 executing at a client 190, which may be an application associated with the financial system 160 such as a mobile banking application, or through web-based interactions transmitted via a web browser or general-purpose client application 195. In some instances, the credit or account application site 166 may be used during the opening of a credit account or a financial account where financial regulations or entity rules require particular identity verifications to be performed.

To use the digital ID consortium API 168, a user completing an application or entering information on the site 166 can provide the inputs of the API 168 via an associated application, and can submit information related to their digital ID. The inputs may be any suitable information that uniquely identifies the user or customer, such as a username, identifier, or other type of user ID associated with the digital ID, as well as any other suitable authentication information. The authentication information may include a passcode, a secret key, biometric data, or any other information that, when combined with the user identifier, can be used to log in to the consortium system 102. In some instances, the digital ID inputs may be automatically provided upon approval by the user, such as when a particular device or client is specifically registered or linked with a particular account. In doing so, and after the user has opened or otherwise accessed their device, the corresponding digital ID credentials may be automatically filled by a password manager or operating system function while the application is being completed.

Once the inputs are received and submitted, the digital ID consortium API 168 can then appropriately format and subsequently transmit that received input to the consortium system 102 via the member interface 108. Once received at the consortium system 102, the member interface 108 can provide the received input to a digital ID authentication engine 110, which can perform operations to validate and verify the received credentials.

As illustrated, the consortium system 102 can include memory 118. Memory 118 of the consortium system 102 may represent a single memory or multiple memories. The memory 118 may include any memory or database module and may take the form of volatile or non-volatile memory including, without limitation, magnetic media, optical media, random access memory (RAM), read-only memory (ROM), removable media, or any other suitable local or remote memory component. The memory 118 may store various objects or data, including financial data, user and/or account information, administrative settings, password information, caches, applications, backup data, repositories storing business and/or dynamic information, and any other appropriate information associated with the consortium system 102, including any parameters, variables, algorithms, instructions, rules, constraints, or references thereto. Additionally, the memory 118 may store any other appropriate data, such as VPN applications, firmware logs and policies, firewall policies, a security or access log, print or other reporting files, as well as others. While illustrated within the consortium system 102, memory 118 or any portion thereof, including some or all of the particular illustrated components, may be located remote from the consortium system 102 in some instances, including as a cloud application or repository, or as a separate cloud application or repository when the consortium system 102 itself is a cloud-based system. As illustrated and previously described, memory 118 includes information on a plurality of users 120, which can include information used to match the received credentials to a particular user ID 122. Each of the users may have opted-in to using the consortium system 102 and its capabilities, and may be associated with a unified or related set of identifiers used within the consortium system 102 and its related systems. The user ID 122 may identify the digital ID itself, or may reference it. Each user may be associated with one or more related accounts 124 (and corresponding account-specific identifiers, in some instances), where the related accounts 124 identify one or more other consortium members 150 with whom specific information about the user corresponding to the digital ID may be available. Using those identifications, the digital data collection engine 114 can be used to access the corresponding customer information 158 at the respective consortium members 150. In some instances, however, at least some of the information about a particular user may be stored within the user information 120 as stored user data 126, which may be used as a data cache or storage location in some instances.

In some instances, the digital ID authentication engine 110 may, upon successfully authenticating the digital ID, generate a token or other authorization indication representing and providing access to the financial system 160 to access one or more user-related accounts for user identity verification information. The digital ID authentication engine 110 can include an authorization provider 112 capable of generating the appropriate token or authorization credentials needed to access the appropriate database, table, or information.

In some instances, the financial system 160 may be able to directly interact with one or more consortium members 150 to obtain the information, where the financial system 160, through an identity analysis engine 174, can query those respective consortium members 150 through network 140, and can include the generated token or identifier providing the authorization, to retrieve or access the user-related information needed for the identity verification.

Alternatively, the authorization provider 112 can provide the generated token to the digital data collection engine 114 of the consortium system 102, which can then access the authorized customer information 158 of the various associated consortium members 150 to provide the required or needed information. A member access module 116 may be included in or a part of the digital data collection engine 114, and can allow the engine 114 to provide the authorization information to the respective consortium members 150 during the search and interactions. The digital data collection engine 114 can communicate through an appropriate interface or channel with the various consortium members 150, including through a consortium interface 152 included or available at each consortium member 150. The consortium interface 152 (also illustrated within the financial system 160) can be used to manage communications with the consortium system 102. In some instances, the consortium interface 152 may be a specific program or application executing at those consortium members 150, while in others the consortium interface 152 may be functionality or a product already included in or available at those consortium members 150, but that is used to manage and communicate with the consortium system 102. The consortium interface 152 may be an API or other suitable interface, and may be associated with or a part of a data management system or database maintained at or by those consortium members 150.

As illustrated, the consortium interface 152 includes an access analysis module 154 and a data access module 156. The access analysis module 154 can determine, based on information included in or related to a received request, whether access to particular information is allowed using the consortium interface 152. As noted, the access analysis module 154 can analyze or check any suitable authorization information that may be generated, for instance, by the authorization provider 112. In some instances, an authorization token, certificate, or other electronic indication may be included in or attached to requests for information from the consortium member 150. In those instances, the authorization token or component may include information about a level of access or information to which the request has been authorized to receive, as well as specifics about which information and whose information is allowed. In those and/or alternative instances, the query or request may also include information about the specific user account to be searched and the information requested. The authorization information may be included with the request, or alternatively, the consortium interface 152 may respond to the digital ID authentication engine 110 to confirm the request and authorization. If the request is authorized, the consortium interface 152 can use its data access module 156, or any other suitable component or functionality, to obtain the requested customer information 158 stored at, referenced by, or related to the consortium member 150. In some instances, customers and users of a particular consortium member 150 may be able to limit the data shared with other consortium members 150, such as through opt-in or opt-out mechanism, account settings, or other access restrictions 159. The restrictions 159 may be specific to consortium access, or may be more generally applied to the account. In some instances, the restrictions 159 may be applied by default, and only removed or reduced in response to affirmative acceptance by the corresponding user. Once the data is obtained, the consortium interface 152 can send the information back to the consortium system 102, or alternatively, directly to the financial system 160 or other consortium member 150 associated with the requested information.

Returning to the consortium system 102 and memory 118, information identifying a plurality of consortium members 128 can be stored and made available. The information to identify the various members 128 (i.e., consortium members 150 and financial system 160) of the consortium, as well as connection data 130 identifying how and where to obtain information from those members 128. In some instances, a set of allowed access parameters 132 can include data on the types of information available from different consortium members 128. The access parameters 132 can, in some instances, identify particular information stored at different members 128, such that when combined with information on the related accounts 124 of different users and the available information, the digital data collection engine 114, can analyze to determine from which consortium members 128, 150 to attempt to obtain the data in association with a particular user or customer. If user X is known to have related accounts 124 at three consortium members 128, and those three consortium members 128 each offer a different portion of the data requested, then each member 128 may be contacted to obtain the full set of information. If, however, one of the members 128 can provide all of the required information, the digital data collection engine 114 can elect or determine to only use a single request to that consortium member 128, 150.

Memory 118 also includes a set of access rules 134, which can be used to determine and provides instructions for how various consortium member interactions are to occur, including priority between consortium members 150, restrictions on access, requirements for being included in or associated with the consortium system 102, and other details and requirements. The access rules 134 can be used to ensure that no consortium member 150 is overly burdened by requests where similar information is available from multiple members, and may provide load balancing rules for consortium-related requests. In other instances, the access rules 134 can be used to define a number of times a particular consortium member 150 can access other members' 150 data, or identify costs or requirements to do so. In some instances, the access rules 134 can be defined in order to maintain a reasonable operation of the system 102, and ensure that interactions with members 150 are performed in an organized and reasonable manner. Any suitable rules can be defined and used to maintain the system 102. In some instances, specific members 150 may be associated with member-specific rules or restrictions, which can be enforced by the system 102 during operations.

As noted, financial system 160 represents an example system representing a potential consortium member 150, and is not meant to be limiting to the particular types of consortium members that may be used. In some instances, financial system 160 may be a retailer, a bank, a public or government institution, an employer, a business, a non-profit organization, or any other suitable entity or system. As illustrated, the financial system 160 includes various components, including interface 162 for communication (which may be similar to or different from interface 104), at least one processor 164 (which may be similar to or different from processor(s) 106, and which can execute the functionality of the financial system 160), a credit or account application site 166, a credit adjudication and creation engine 170, a user authentication engine 172, an identity analysis engine 174, a consortium interface 176, and memory 178 (which may be similar to or different from memory 118).

The credit or account application site 166 (referred to herein as the credit application site 166) may be a web page, web-based application, or other software provided by or associated with the financial system 160. The credit application site 166 represents an interactive website, form, or other interactive component at which information associated with a credit application can be submitted. The credit application site 166 may be a front-end used to receive input for the credit or account application, and can provide the received information to one or more related systems, such as the credit adjudication and creation engine 170. In some instances, the credit application site 166 may receive, via client 190 and its client application 195 or a digital ID application 194, information from a potential or current customer associated with a request for credit or an application for an account. The information related to the credit or account application can include personally identifiable information (PII), as well as sensitive financial information related to the customer. In general, the site 166 is meant to be the intake location for applications related to the financial system 160, particularly where specific and detailed identification information may be necessary to complete the application process, such as in financing or credit account applications. In some instances, site 166 may be accessed directly, while in others, the site 166 may be accessed through a dedicated or general application or browser (e.g., client application 195 and digital ID application 194). In either instance, information can be received by the financial system 160 and used to consider and evaluate application credentials, credit history, demographic information, and other analyses related to the application and/or credit adjudication process. Site 166 may also use the user authentication engine 172 and identity analysis engine 174 to confirm the identity of the user. The user authentication engine 172 can allow the user to login if already known by the financial system 160, particularly where account credentials with the user or customer match those on file or already available to the financial system 160. In some instances, the user may not be known to the financial system 160, or, even if know, additional data may be needed for an identity analysis to confirm the user's identity beyond a simple account login, such as where additional financing is requested. In those instances, the identity analysis engine 174 can attempt to perform the additional analysis based on application information received from the user, or can determine that additional information is needed.

Various analyses may be required, including for example, an Anti-Money Laundering (AML) analysis, a Know Your Customer Analysis (KYCA) and/or an Identity Analysis to confirm the person is who they say they are, a Fraudulent Application Analysis to determine if the person applying is who they say they are, and a Creditworthiness Analysis to determine if this person is able to pay back the credit if authorized. The AML and creditworthiness analyses may be easier to pass based on existing approval rules 187 and other considerations for those analyses. However, the identity-related analyses may be difficult as strict identity determinations are required for many financial applications. In such instances, the digital ID consortium API 168 can be used to leverage the consortium system 102 and the information maintained by and available from the consortium members 150.

In some instances, the credit or account application site 166 can redirect users to a new web page or application associated with the API 168, while in others, the API 168 may be embedded within the site 166 to avoid any redirections, allowing the experience to be fully realized within the site 166 and/or application used to interact with the site. The API 168 may require a specific set of user information corresponding to the user's user ID 122 as previously described. Based on the required fields needed by the site 166, the consortium system 102 can identify the user's related accounts 124 and the consortium members 128 with the corresponding information. Where the information is available, requests can be sent to those consortium members 150 to obtain the relevant information, and can be provided back to the site 166 for insertion into the application. Using that information, the identity analysis engine 174 can quickly confirm the identity of the user, where in previous solution, significant manual operations and interactions would be required, including having the user or customer provide additional physical proof or in-person answers to confirm their identity.

In some instances, the application site 166 may allow users to initially log into the consortium using the API 168 before any other information is provided, or otherwise early in the process. The information required by the application can be obtained through the consortium system 102, allowing identity information to be filled within the application prior to an attempt to submit the application itself.

Once the digital ID is confirmed with the consortium system 102, a further search can be performed to obtain any suitable related information about the user. In some instances, a token or other set of credentials may be provided back to the site 166, allowing the financial system 160 to query one or more other consortium members 150 directly. In other instances, the digital data collection engine 114 of the consortium system 102 can interact with the consortium members 150 on behalf of the financial system 160, and can return any suitable results back to the financial system 160 and its application. In other instances, responses may be provided via the consortium interface 176 of the financial system 160. The consortium interface 176 may be similar to the consortium interface 152, and may be used by the consortium system 102 when accessing and obtaining information from the financial system 160 for one or more of the other consortium members 150.

In general, the digital ID consortium API 168 can allow the user to authenticate themselves to the consortium system 102 (e.g., via OAuth 2.0 and OpenID Connect), such that the information available within the expanded consortium network and databases of the various consortium members 150 are made available to the financial system 160 to complete its application and identity verification operations, which can include the credit or account application.

The credit adjudication and creation engine 170 may be a combined credit adjudication engine and a credit creation engine, or it may be two separate components in some instances. Once the credit application is completed and submitted, the credit or account application site 166 can provide the relevant information to the engine 170, where the engine 170 can perform a creditworthiness analysis based on one or more credit rules 186 defined by the financial system 160 (and here, stored in memory 178). The credit rules 186 can be used to determine whether the application is to be accepted or rejected, as well as an amount associated with the acceptance, where appropriate for credit purposes. The engine 170 can access one or more databases and credit bureaus when making its determination based on the information provided via the application site 166 and obtained from the consortium members 150, if necessary, and, in some cases, can provide an instantaneous or near-instantaneous decision regarding the credit application.

In response to approving the application, the engine 170 can create a new credit account or general account for the customer as approved during the adjudication process. The engine 170 may act as a master account management system, and can perform credit provisioning and management within the financial system 160. In some instances, the engine 170 may be associated with a credit management system offered by TSYS or another vendor. The engine 170 can generate the new credit account or other account associated with a personal account number (PAN) 180, as well as some or all of the information associated with the customer received from the credit application, which can be stored in the account data 181. In some instances, the personal account number (PAN) 180 may be associated with a specific user ID 182, which may be similar to or related to user ID 122 stored in the consortium system 102, or which may be referenced within the customer information 120 for linking purposes for obtaining information via the consortium system 102. In many instances, the result of the credit generation process is the creation of a new, unique account number that can be used to perform one or more transactions on or associated with the new account. In some instances, the engine 170 can generate or otherwise obtain a payment token associated with the new account, where the payment token can be used in lieu of the account number or PAN 180 to initiate a transaction with one or more systems.

As the application is being completed, a set of application data 183 may be created and managed during the process. The application data 183 can include information received during the application process received from the user or customer, consortium data 185 obtained from one or more consortium members 150, and a set of analysis results 184 indicating the results of the application process. The results of the analysis can be governed or determined by the approval rules 187 used throughout the application process, which can determine which analyses are to be performed and what type of results are required for approval.

As illustrated, one or more clients 190 may be present in the example system 100. Each client 190 may be associated with a particular user or customer, or may be accessed by multiple users customers, where a particular user is associated with a current session or interaction at the client 190. Client 190 may be a client device at which a particular user or customer is linked or associated, including users with existing accounts matching particular accounts of the financial system 160 or other consortium members 150. The client 190 may also be a client device through which the particular user uses a client application 195 which interacts with financial system 160, and through the consortium system 102, one or more of the consortium members 150. As illustrated, the client 190 may include an interface 191 for communication (similar to or different from interface 104 and 162), at least one processor 192 (similar to or different from processor 106 and 164), a graphical user interface (GUI) 193, the client application 195, an optional digital ID application 194, and a memory 196 (similar to or different from memory 118 and 178).

The illustrated client 190 is intended to encompass any computing device such as a desktop computer, laptop/notebook computer, mobile device, smartphone, personal data assistant (PDA), tablet computing device, one or more processors within these devices, or any other suitable processing device. In general, the client 190 and its components may be adapted to execute any operating system, including Linux, UNIX, Windows, Mac OS®, Java™, Android™, or iOS. In some instances, the client 190 may comprise a computer that includes an input device, such as a keypad, touch screen, or other device(s) that can interact with one or more client applications, such as one or more mobile applications, including a web browser, mobile wallet or other banking application, and an output device that conveys information associated with the operation of the applications and their application windows to the user of the client 190. Such information may include digital data, visual information, or a GUI 193, as shown with respect to the client 190. Specifically, the client 190 may be any computing device operable to communicate with the financial system 160, other clients 190, the consortium system 102, one or more consortium members 150, and/or other components via network 140, as well as with the network 140 itself, using a wireline or wireless connection. In general, client 190 comprises an electronic computer device operable to receive, transmit, process, and store any appropriate data associated with the environment 100 of FIG. 1.

The client application 195 executing on the client 190 may include any suitable application, program, mobile app, or other component. Client application 195 can interact with the credit or account application site 166, the financial system 160 generally, or portions thereof, via network 140. In some instances, the client application 195 may be a web browser, where the functionality of the client application 195 may be realized using a web application or website the user can interact with via the client application 195. In other instances, the client application 195 may be a remote agent, component, or client-side version of the credit or application site 166, or a dedicated application associated with the financial system 160. In some instances, the client application 195 may interact directly with the financial system 160 or portions thereof. The client application 195 may be used to view, interact with, or otherwise transact data exchanges and transactions with the financial institution system 160, monitor, modify, and interact with one or more existing accounts, and allow interactions for account or credit application submissions via the financial system 160, among others.

The digital ID application 194 may be an application or other program available at the client 190 to interact with and manage accounts, permissions, and data associated with the consortium system 102 at a user-level. For example, the digital ID application 194 can allow users to confirm or add accounts to their related accounts 124, and can identify or restrict the types of data that can be used from various consortium members 150, in some cases. In some instances, the digital ID application 194 may be used in connection with a particular credit or account application, and can be used to provide login information for the digital ID associated with the consortium system 102.

GUI 193 of the client 190 interfaces with at least a portion of the environment 100 for any suitable purpose, including generating a visual representation of any particular client application 195 or digital ID application 194, any components of the financial system 160, and/or the consortium system 102 and related consortium members 150. In particular, the GUI 193 may be used to present screens and information associated with the credit or account application site 166, for example, as well as other interactions with the financial system 160 and other components. GUI 193 may also be used to view and interact with various web pages, applications, and web services located local or external to the client 190. Generally, the GUI 193 provides the user with an efficient and user-friendly presentation of data provided by or communicated within the system. The GUI 193 may comprise a plurality of customizable frames or views having interactive fields, pull-down lists, and buttons operated by the user. In general, the GUI 193 is often configurable, supports a combination of tables and graphs (bar, line, pie, status dials, etc.), and is able to build real-time portals, application windows, and presentations. Therefore, the GUI 193 contemplates any suitable graphical user interface, such as a combination of a generic web browser, a web-enable application, intelligent engine, and command line interface (CLI) that processes information in the platform and efficiently presents the results to the user visually.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
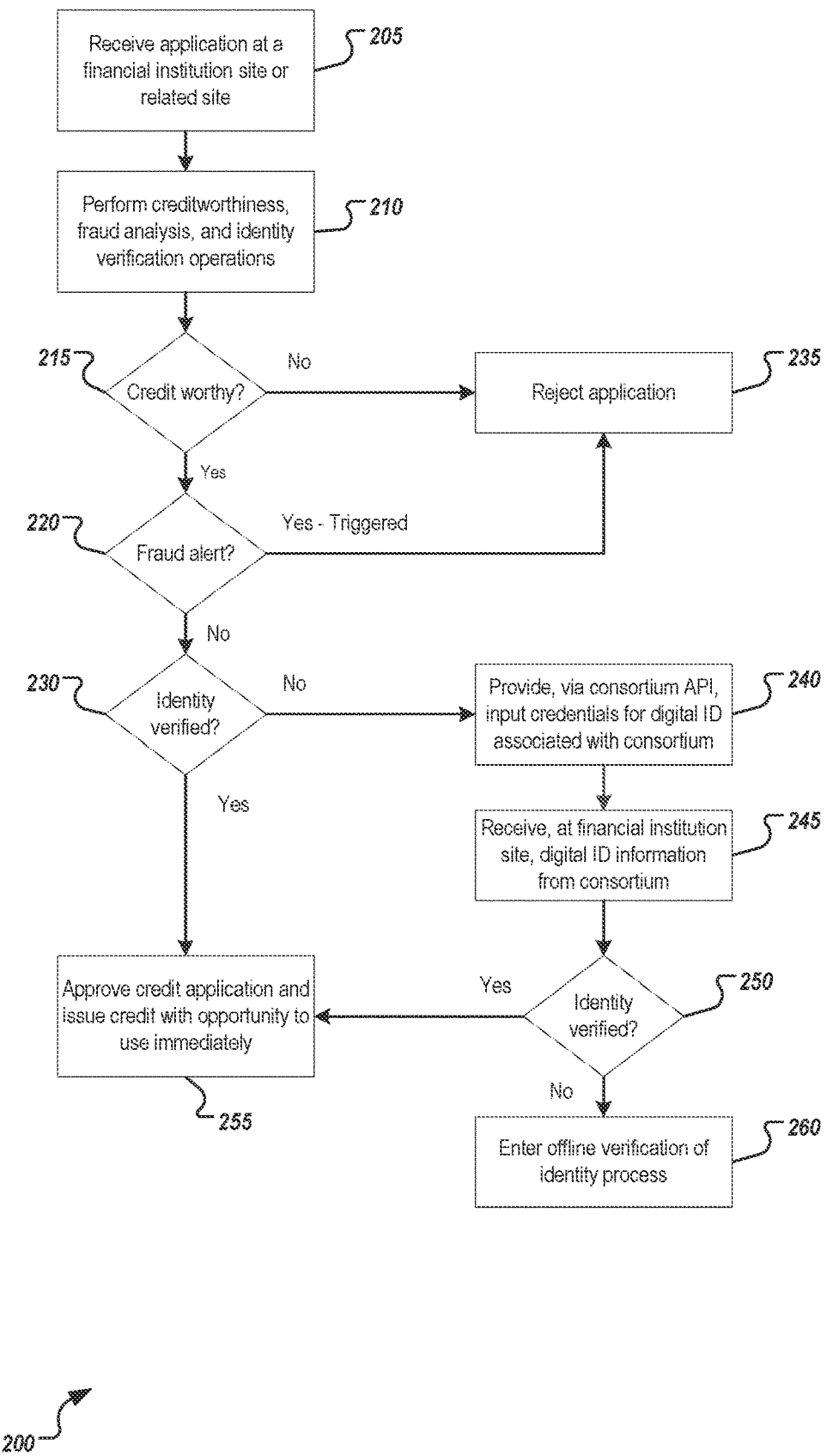
FIG. 2 illustrates a data and control flow of example interactions performed in providing credit application and provisioning operations associated with a financial institution within ongoing online interactions with one or more merchant's transactions in one example of the first implementation.

FIG. 2 is a flow diagram of an example method for performing identity validation using a digital identification (ID) shared and trusted in among a coalition of institutions in one example. It will be understood that method 200 may be performed, for example, by any other suitable system, environment, software, and hardware, or a combination of systems, environments, software, and hardware as appropriate. In some instances, method 200 can be performed by the financial system 160, or portions thereof, described in FIG. 1, as well as other components or functionality described in other portions of this description. Any suitable system(s), architecture(s), or application(s) can be used to perform the illustrated operations.

In one instance, method 200 describes a method performed at a financial system at which a data exchange, or financial transaction, may be performed, as well as, in part, at a financial institution providing functionality to apply for credit. The system may include a communications module, at least one memory, and at least one hardware processor interoperably coupled with the at least one memory and the communications module. The at least one memory can store instructions and a repository storing a set of user accounts associated with a plurality of users. The memory may also store instructions that instruct the at least one hardware processor to perform particular operations.

At 205, an interactive and/or online application for credit or an account associated with a first financial institution may is received via an online or digital application or website. The application may be completed at a system local to the first financial institution, or may be completed remotely via a dedicated mobile application or a web browser at a client device. The application is associated with a particular user or customer, and can include information specific to that particular user or customer.

At 210, a set of analyses and operations required to approve the submitted application can be performed. In some instances, those analyses can include a creditworthiness analysis, a fraudulent application analysis (which may include an AML analysis), and an identity analysis. The analyses are needed to confirm that the person requesting or applying for the account is valid, that the person actually applying is who they say they are and that the applicant or request is not a high risk for financial crimes, and that the person is able to pay back the credit if authorized. The analyses may be performed in any order, and may be performed in a different order than illustrated in FIG. 2. Further, the analyses may be performed in parallel, where a rejection under any of the analyses will lead to a rejection of the entire application.

At 215, a creditworthiness analysis is performed, and a determination is made as to whether the user is creditworthy. The creditworthiness analysis may be performed based on a determination as to whether the applicant has the ability to pay for the amount requested, or alternatively, to determine an appropriate amount of credit to approve. Any suitable basis for this determination may be used, such as those used traditionally in determinations at financial institutions. If determined to be creditworthy, method 200 continues to 220. If not determined to be creditworthy, then method 200 continues to 235, where the application can be rejected and the process can end. At 220, a fraud alert can be performed. Again, the fraud alert may be based on any existing or future fraud analysis as it relates to the financial analysis, and may be based on known rule sets and evaluation techniques. Again, if the fraud alert is triggered, then method 200 continues at 235 where the application is rejected. If no fraud alert is triggered, method 200 continues at 230.

At 230, an identity analysis operation is performed, and a determination is made as to whether the user or customer is known as required for purposes of the current application. In many instances, and particularly for financial accounts and credit, federal, state, and financial institution requirements require a strict determination of the person applying for credit or an account. Because many transactions are performed online or virtually, many financial institutions may not have easy access to identification documents and confirmation techniques previously available to in-person loan applications. Further, some financial institutions may not be associated with brick-and-mortar locations, and may currently rely on third-party in-person identity verification services and providers, such as governmental postal services and others. If the user or customer associated with the application is a current user or customer known to the institution, then identity may be easily verified. If, however, the user is not known, or has not previously provided the full identity information, the identity evaluation may not be so simple, and may continue at 240.

Figure 3:
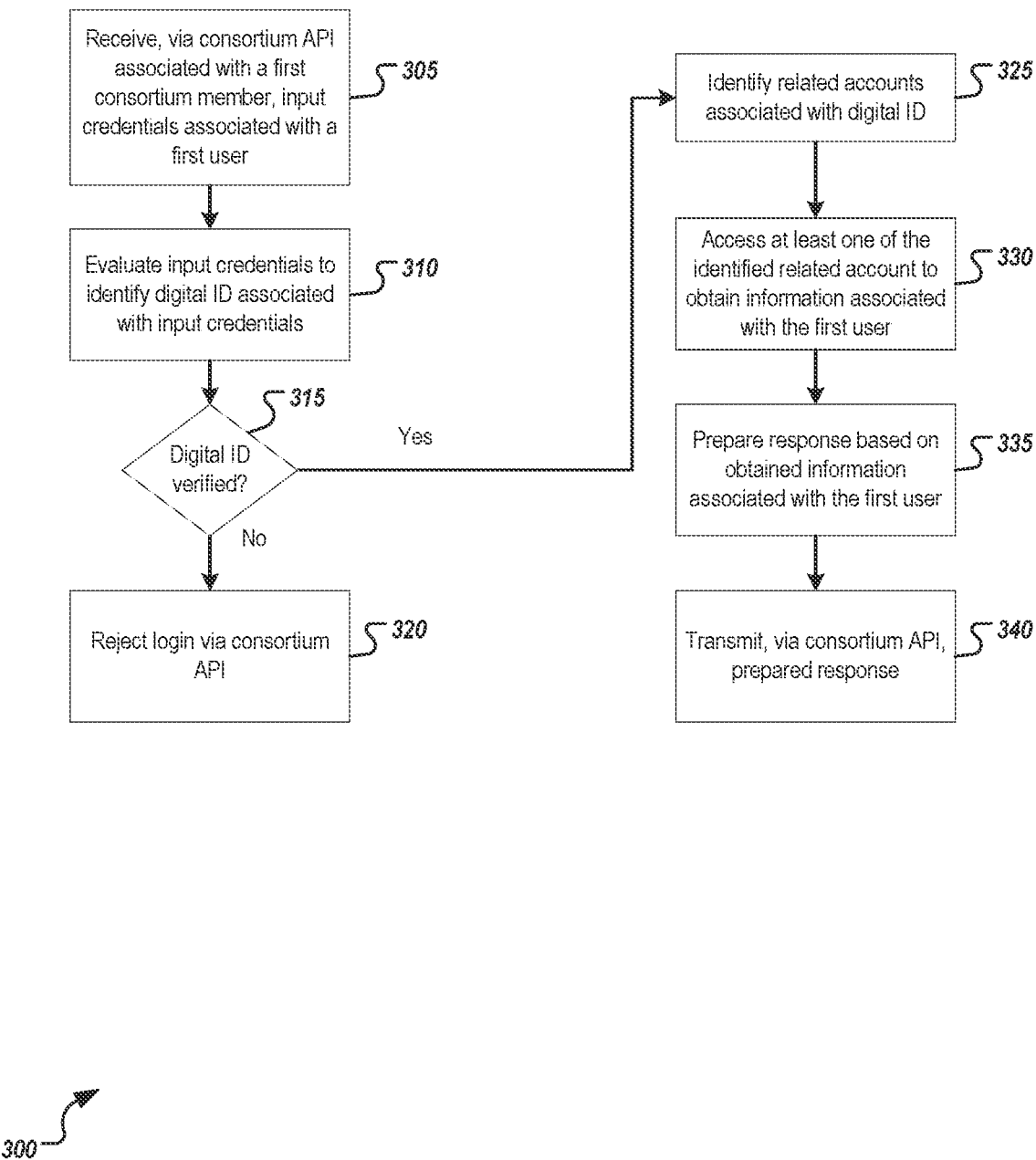
FIG. 3 is a flow diagram of an example method for automatically providing credit application and provisioning operations associated with a financial institution within ongoing online interactions with one or more merchant's transactions in one example of the first implementation.

In the illustrated example, at 240, the financial system may receive from the user and then transmit, using a communications interface and an API associated with a consortium system, user credentials associated with a digital ID for the user associated with the application and matching those managed at the consortium. As described previously, the online application may be associated with or may embed a consortium API or inputs for the consortium API, which can allow the user to provide credentials associated with a digital ID maintained by the consortium system (e.g., consortium system 102 as described in FIG. 1). The user credentials may include a specific digital ID and a corresponding password or other set of identifiers. One example process of how the consortium system 102 processes such requests is illustrated in FIG. 3. In some instances, the financial system may determine the particular data and data types needed from the consortium to complete the user identification process. That information can also be sent to the consortium system for consideration and application in determining where and from what consortium member information should be obtained.

In response to transmitting the digital ID input credentials, at 245, the financial institution site can receive a corresponding set of digital ID information from the consortium system. The information can include specific identifying information regarding the user, previously submitted or available information about the user from one or more other consortium members, and other information, including confirmation of particular information submitted with the application.

Using the received information, alone or in connection with the information already received at 205, a determination can be made at 250 as to whether the user or customer's identity can be verified to the level required by the financial institution and/or per government regulations.

If the user's identity can be successfully verified, method 200 continues at 255, where the credit or account application can be approved, assuming all other requirements have been met. The credit or account application can be approved in connection with a requested amount or for a particular purpose based on the prior creditworthiness analysis. In some instances, the financial institution can allow immediate use of the new credit or account, and will not need to wait for further identity verification as sometimes needed in prior solutions.

If, however, the user's identity still cannot be sufficiently verified, method 200 continues at 260, where an offline verification process can be performed. That process can include having the user appear at a location of the financial institution or third-party location associated with or having a relationship with the financial institution and providing the necessary documentation and proof required to establish their identity. In response to doing so, the received information received offline can be added to the information stored about the customer in the financial institution in some instances, which can allow that information to be accessed by other consortium members in the future.

FIG. 3 is a flow diagram of an example method for performing identity validation using a digital identification (ID) shared and trusted in among a coalition of institutions in one example. It will be understood that method 300 may be performed, for example, by any other suitable system, environment, software, and hardware, or a combination of systems, environments, software, and hardware as appropriate. In some instances, method 300 can be performed by the consortium system 102, or portions thereof, described in FIG. 1, as well as other components or functionality described in other portions of this description. Any suitable system(s), architecture(s), or application(s) can be used to perform the illustrated operations.

In one instance, method 300 describes a method performed at a computing system at which a data exchange may be performed, as well as, in part, in association with an attempted application for an account or for approval of credit, among other things. Any suitable identity verification process may be used at a financial institution providing functionality to apply for credit. The system may include a communications module, at least one memory, and at least one hardware processor interoperably coupled with the at least one memory and the communications module. The at least one memory can store instructions and a repository storing a set of user accounts associated with a plurality of users, including information linking those user accounts to individual digital IDs. In some instances, each user may be associated with a user profile corresponding to the digital ID, where the user profile can include information about the user and their respective related accounts. In some instances, the user profiles may also include information associated with the corresponding user, such that the consortium system can access relevant data requested by an application or site and respond to the request without accessing additional consortium accounts. The memory may also store instructions that instruct the at least one hardware processor to perform particular operations.

At 305, a set of input credentials associated with a first user are received via a consortium API associated with a first consortium member. The first consortium member may be any institution, entity, or business acting as a consortium member within the described consortium system, where the first consortium member allows its users to obtain additional information about themselves for applications and identity verifications using the consortium system. In one implementation, the first user may use the consortium API after one or more identity verification operations have failed, or have failed to provide or obtain a particular piece of user identity information. In other instances, the first user may use the consortium API before inputting any information about themselves, such that their input credentials can be used to obtain the full set of information needed by the first consortium member's application or verification operations. In some instances, the request may include an indication of particular fields or types of information needed by the first consortium member, thereby allowing a more targeted consortium search to be performed. In some instances, the received input credentials can include a user name associated with the first user's digital ID as well as additional authentication information, such as a password, biometric information, or other data used to validate the digital ID of the first user at the consortium system.

At 310, those input credentials are evaluated to identify a digital ID associated with and corresponding to the credentials. At 315, a determination is made as to whether the credentials and corresponding digital ID are verified. If the digital ID cannot be verified, method 300 continues at 320, where the consortium system can transmit a rejection of the login to the consortium system via the consortium API. In some instances, a secondary message or indication of the rejection may be transmitted to an appropriate endpoint or via a registered communication channel associated with the digital ID to provide notification of the failed attempt. If, however, the digital ID is verified, method 300 continues at 325.

At 325, a set of related accounts associated with the digital ID are identified. The set of related accounts corresponds to accounts of the first user that are maintained or registered with one or more of the other consortium members. In addition to an identification of the particular related accounts associated with the first user, information related to logins to the respective related accounts may be available and provide the information needed to access those related accounts at the other consortium members. In some instances, the consortium system can generate an authentication token, set of tokens, or other authentication component or artifact that can be used to allow access to the one or more related accounts. In some instances, the consortium system may store or manage an identification of particular information stored at or available from different consortium members. In such instances, information about particular information needed by the first consortium member (e.g., as obtained at the same time as or included with the input credentials of the first user via the consortium API at 305) may be used to determine which of the related accounts and consortium members may store or have available the particular information needed. In such instances, the consortium system can determine a subset of the systems from which the information may need to be queried or otherwise accessed. In other instances, various consortium members may be accessed to obtain or otherwise access the required information.

At 330, at least one of the identified related accounts can be accessed to obtain information associated with the first user. Again, in some instances, only the information needed by the first consortium member may be searched for and/or obtained, while in other instances, additional information may be obtained for a response. In some instances, only a single related account may be accessed from a set of two or more related accounts associated with the first user, while in others, multiple related accounts may be accessed, where appropriate. Accessing the related accounts can include any suitable manner of accessing the relevant accounts. In some instances, the consortium system may generate and transmit an appropriate query (e.g., an SQL query) to the particular consortium member associated with the related account, and can receive a corresponding response with the requested information associated with the first user. In other instances, the consortium system may be able to directly access the other consortium members through a dedicated channel, interface, or other suitable connection. For example, a consortium member interface may be provided at some or each of the consortium members, allowing the consortium system to perform authorized access of particular consortium member systems when suitable authentication is provided for the first user.

At 335, the obtained information about the first user can be used to prepare a response to the request received via the consortium API. In some instances, the response can be formatted in a format required by the consortium system, which may be a standardized format used by each consortium member according to the consortium API used by the various consortium members. In some instances, the prepared response may not provide the obtained information, but may instead provide an indication to the first consortium member that the identity of the first user is and has been successfully authenticated previously by those consortium members, such that the prior authentication can be imputed to the current identity verification at the first consortium system.

At 340, the prepared response can be transmitted, via the consortium API, back to the first consortium member. The first consortium member can then use the information obtained via the consortium system to complete the identity verification.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system, comprising:
   a communications interface;
   at least one memory storing instructions and at least one hardware processor interoperably coupled with the at least one memory and the communications interface, wherein the instructions, upon execution by the at least one hardware processor, cause performance of operations comprising:
   receiving, via the communications interface and from a computing device associated with a first user, (1) a request to create a new credit account for the first user and (2) a set of input credentials associated with the first user;
   identifying, using the set of input credentials associated with the first user and from a repository storing an association between digital IDs and input credentials, a first digital ID corresponding to the set of input credentials associated with the first user, wherein the first digital ID is a unique identifier for the first user;
   transmitting, via the communications interface and using an API associated with a trusted consortium network, the first digital ID, wherein the trusted consortium network facilitates user identity verification;
   receiving, via the communications interface and from the trusted consortium network, digital ID data corresponding to the first digital ID that includes a set of information associated with the first user from one or more accounts at one or more consortium member systems of the trusted consortium network; and
   verifying, using the digital ID data, an identity of the first user; and
   automatically approving and provisioning credit for the first user in response to verifying the identity of the first user.

2. The system of claim 1, wherein automatically approving and provisioning credit for the first user in response to verifying the identity of the first user comprises:
   generating a new credit account for the first user that is associated with a new and unique account number.

3. The system of claim 2, wherein automatically approving and provisioning credit for the first user in response to verifying the identity of the first user comprises at least one of:
   generating a payment token associated with the new credit account; or
   obtaining, from a payment token generator, a payment token associated with the new credit account.

4. The system of claim 3,
   wherein receiving the request to create the new credit account for the first user comprises receiving request during a current transaction;
   wherein the operations performed upon execution of the instructions comprise performing the current transaction using the payment token.

5. The system of claim 1, wherein the operations performed upon execution of the instructions comprise:

receiving along with the request to create the new credit account for the first user, data provided by the first user as part of a digital credit application form.

6. The system of claim 5, wherein automatically approving and provisioning credit for the first user in response to verifying the identity of the first user comprises:
   determining a creditworthiness of the first user based on the request, the data provided by the first user, and verification data generated upon verifying the identity of the first user.

7. The system of claim 1, wherein the operations performed upon execution of the instructions comprise:
   performing a local identity verification process for the first user and determining, by the local identity verification process, that an identity of the first user is unverifiable,
   wherein the identity verification for the first user using the trusted consortium network is performed only after determining that the identity of the first user is unverifiable by the local identity verification process.

8. The system of claim 1, wherein the trusted consortium network is a blockchain network including a plurality of nodes, each node in the plurality of nodes is associated with a particular consortium member system.

9. The system of claim 1, wherein the operations performed upon execution of the instructions comprise:
   generate an authorization token for accessing data related to the one or more accounts corresponding to the first digital ID at other consortium member systems;
   transmit, to a subset of the other consortium member systems, a request for data associated with the user accounts at the subset of the other consortium member systems; and
   receive responsive sets of data associated with the user accounts from the subset of the other consortium member systems.

10. A non-transitory, computer-readable medium storing computer-readable instructions that, when executed by at least one processor, cause the at least one processor to perform operations comprising:
    receiving, via a communications interface and from a computing device associated with a first user, (1) a request to create a new credit account for the first user and (2) a set of input credentials associated with the first user;
    identifying, using the set of input credentials associated with the first user and from a repository storing an association between digital IDs and input credentials, a first digital ID corresponding to the set of input credentials associated with the first user, wherein the first digital ID is a unique identifier for the first user;
    transmitting, via the communications interface and using an API associated with a trusted consortium network, the first digital ID, wherein the trusted consortium network facilitates user identity verification;
    receiving, via the communications interface and from the trusted consortium network, digital ID data corresponding to the first digital ID that includes a set of information associated with the first user from one or more accounts at one or more consortium member systems of the trusted consortium network; and
    verifying, using the digital ID data, an identity of the first user; and
    automatically approving and provisioning credit for the first user in response to verifying the identity of the first user.

11. The non-transitory, computer-readable medium of claim 10, wherein automatically approving and provisioning credit for the first user in response to verifying the identity of the first user comprises:
    generating a new credit account for the first user that is associated with a new and unique account number.

12. The non-transitory, computer-readable medium of claim 11, wherein automatically approving and provisioning credit for the first user in response to verifying the identity of the first user comprises at least one of:
    generating a payment token associated with the new credit account; or
    obtaining, from a payment token generator, a payment token associated with the new credit account.

13. The non-transitory, computer-readable medium of claim 12,
    wherein receiving the request to create the new credit account for the first user comprises receiving request during a current transaction;
    wherein the operations performed upon execution of the instructions comprise performing the current transaction using the payment token.

14. The non-transitory, computer-readable medium of claim 10, wherein the operations performed upon execution of the instructions comprise:
    receiving along with the request to create the new credit account for the first user, data provided by the first user as part of a digital credit application form.

15. The non-transitory, computer-readable medium of claim 10, wherein automatically approving and provisioning credit for the first user in response to verifying the identity of the first user comprises:
    determining a creditworthiness of the first user based on the request, the data provided by the first user, and verification data generated upon verifying the identity of the first user.

16. The non-transitory, computer-readable medium of claim 10, wherein the operations performed upon execution of the instructions comprise:
    performing a local identity verification process for the first user and determining, by the local identity verification process, that an identity of the first user is unverifiable,
    wherein verifying the identity of the first user using the trusted consortium network is performed only after determining that the identity of the first user is unverifiable by the local identity verification process.

17. The non-transitory, computer-readable medium of claim 10, wherein the trusted consortium network is a blockchain network including a plurality of nodes, each node in the plurality of nodes is associated with a particular consortium member system.

18. The non-transitory, computer-readable medium of claim 10, wherein the operations performed upon execution of the instructions comprise:
    generate an authorization token for accessing data related to the one or more accounts corresponding to the first digital ID at other consortium member systems;
    transmit, to a subset of the other consortium member systems, a request for data associated with the user accounts at the subset of the other consortium member systems; and
    receive responsive sets of data associated with the user accounts from the subset of the other consortium member systems.

19. A computerized method performed by one or more processors, the method comprising:

receiving, via a communications interface and from a computing device associated with a first user, (1) a request to create a new credit account for the first user and (2) a set of input credentials associated with the first user;

identifying, using the set of input credentials associated with the first user and from a repository storing an association between digital IDs and input credentials, a first digital ID corresponding to the set of input credentials associated with the first user, wherein the first digital ID is a unique identifier for the first user;

transmitting, via the communications interface and using an API associated with a trusted consortium network, the first digital ID, wherein the trusted consortium network facilitates user identity verification;

receiving, via the communications interface and from the trusted consortium network, digital ID data corresponding to the first digital ID that includes a set of information associated with the first user from one or more accounts at one or more consortium member systems of the trusted consortium network; and verifying, using the digital ID data, an identity of the first user; and automatically approving and provisioning credit for the first user in response to verifying the identity of the first user.

20. The method of claim 19, wherein automatically approving and provisioning credit for the first user in response to verifying the identity of the first user comprises:

generating a new credit account for the first user that is associated with a new and unique account number;

at least one of: (1) generating a payment token associated with the new credit account or (2) obtaining, from a payment token generator, a payment token associated with the new credit account; and performing a current transaction using the payment token.

\* \* \* \* \*